US012067117B2

(12) United States Patent
Hatekar et al.

(10) Patent No.: US 12,067,117 B2
(45) Date of Patent: Aug. 20, 2024

(54) EFFICIENT USAGE OF SANDBOX ENVIRONMENTS FOR MALICIOUS AND BENIGN DOCUMENTS WITH MACROS

(71) Applicant: Microsoft Technology Licensing, LLC, Redmond, WA (US)

(72) Inventors: Abhijeet Surendra Hatekar, Kirkland, WA (US); Amirreza Niakanlahiji, Mountain View, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 269 days.

(21) Appl. No.: 17/668,286

(22) Filed: Feb. 9, 2022

(65) Prior Publication Data

US 2023/0252148 A1 Aug. 10, 2023

(51) Int. Cl.
G06F 21/00 (2013.01)
G06F 21/53 (2013.01)
G06F 21/56 (2013.01)

(52) U.S. Cl.
CPC ............ G06F 21/566 (2013.01); G06F 21/53 (2013.01); *G06F 2221/034* (2013.01)

(58) Field of Classification Search
CPC .. G06F 21/566; G06F 21/53; G06F 2221/034; G06F 21/563
See application file for complete search history.

(56) References Cited

U.S. PATENT DOCUMENTS 9,317,679 B1 * 4/2016 Bhatkar ................ G06F 21/562
11,349,865 B1 * 5/2022 Satpathy ............... G06F 21/562
(Continued)

FOREIGN PATENT DOCUMENTS

EP 3926502 A1 12/2021

OTHER PUBLICATIONS

Zhao et al., "Research on Malicious Code Homology Analysis Method Based on Texture Fingerprint Clustering", 2018 17th IEEE International Conference On Trust, Security And Privacy In Computing And Communications/ 12th IEEE International Conference On Big Data Science And Engineering, (Year: 2018).*
Gibert, et al., "The Rise of Machine Learning for Detection and Classification of Malware: Research Developments, Trends and Challenges", In Journal of Network and Computer Applications, vol. 153, Jan. 2, 2020, 22 Pages.
"International Search Report and Written Opinion issued in PCT Application No. PCT/US23/010259", Mailed Date: May 10, 2023, 15 Pages.

(Continued)

*Primary Examiner* — Morshed Mehedi
(74) *Attorney, Agent, or Firm* — MANNAVA & KANG, P.C.

(57) ABSTRACT

According to examples, an apparatus may include a processor and a memory on which is stored machine-readable instructions that may cause the processor to determine a code fingerprint of a document containing a macro, in which the code fingerprint corresponds to a functionality of the macro. The processor may also determine whether the code fingerprint of the document matches a cluster code fingerprint associated with a cluster of documents. Based on a determination that the code fingerprint matches the cluster code fingerprint associated with the cluster of documents, the processor may determine whether the cluster of documents has been identified as being malicious or benign. In addition, based on a determination that the cluster of documents has been identified as being malicious or benign, the processor may handle the document as being malicious or benign while preventing the document from being sent to a sandbox environment for detonation of the document.

20 Claims, 8 Drawing Sheets

(56) References Cited

U.S. PATENT DOCUMENTS

| | | | |
|---|---|---|---|
| 2016/0142419 A1* | 5/2016 | Antipa | H04L 63/1441 |
| | | | 726/1 |
| 2016/0212153 A1* | 7/2016 | Livshits | H04L 63/145 |
| 2017/0026550 A1* | 1/2017 | Austin | H04N 1/4413 |
| 2018/0300480 A1* | 10/2018 | Sawhney | G06F 21/563 |
| 2020/0356661 A1* | 11/2020 | Stoletny | H04L 63/1466 |
| 2021/0012328 A1* | 1/2021 | Wilczek | G06Q 30/04 |
| 2022/0269782 A1* | 8/2022 | Chang | G06F 21/562 |

* cited by examiner

EFFICIENT USAGE OF SANDBOX ENVIRONMENTS FOR MALICIOUS AND BENIGN DOCUMENTS WITH MACROS

BACKGROUND

New types of attacks on computer security are being developed and put into use by malicious individuals and organizations. Some attacks have consequences that are relatively easy to detect, such as distributed denial of service (DDOS) attacks or physical attacks such as bombs, earthquakes, or power grid shutdowns. Other attacks are more difficult to detect, such as data theft or malware infection, which may have consequences that may go undetected for a long time or until a large portion of the computing system is implicated, or both. The attacks may rely mainly or entirely on overcoming, tricking, or evading software protections, such as anti-malware software or firewalls or encryptions. Other attacks may rely in some critical way on overcoming, tricking, or evading human precautions.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
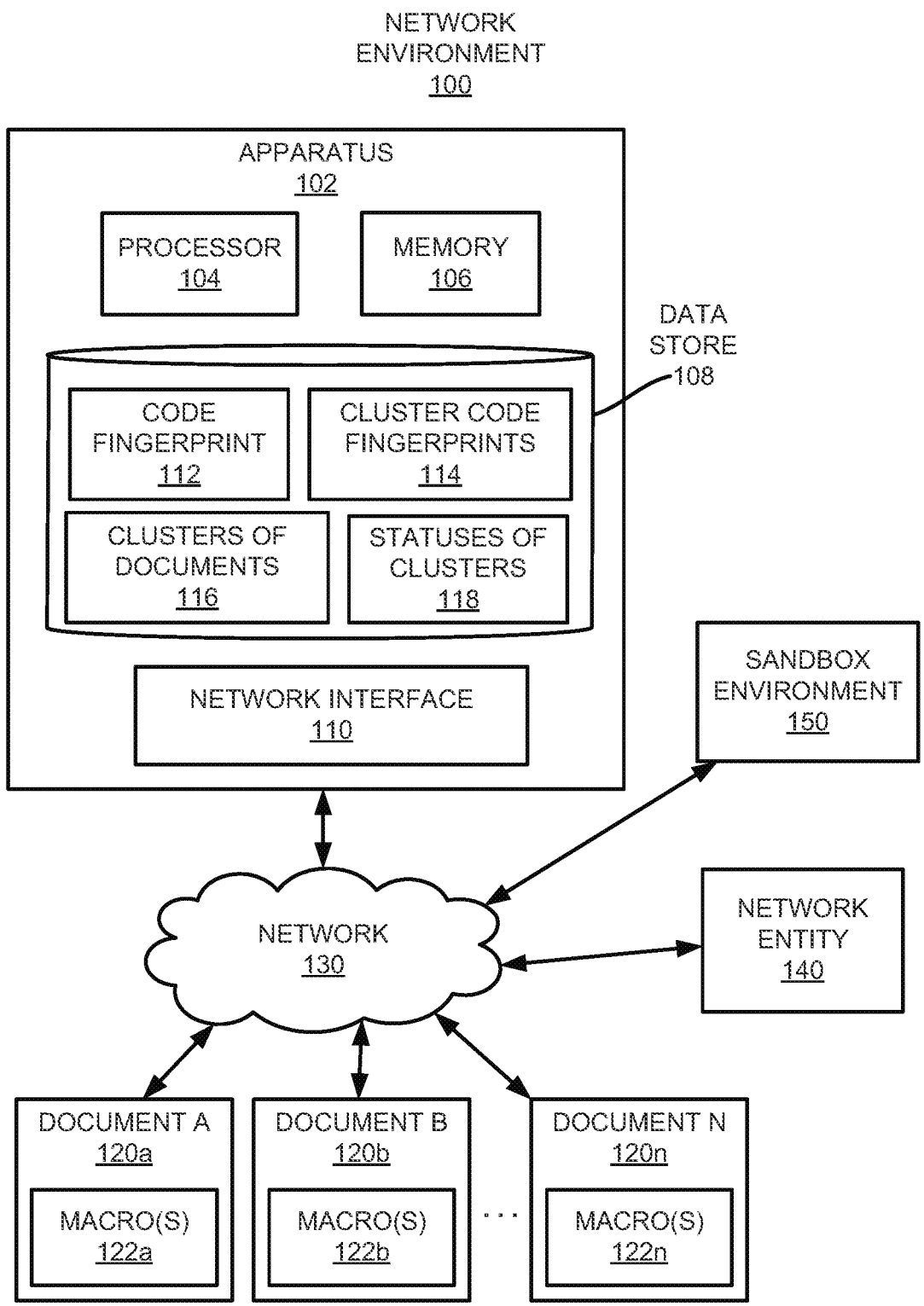
FIG. 1 shows a block diagram of a network environment, in which an apparatus may determine whether a document containing a macro is malicious or benign based on a code fingerprint of the document, and may handle the document as being malicious or benign while preventing the document from being sent to a sandbox environment based on a determination that the document is malicious or benign, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Various types of documents may include macros (or equivalently, macro instructions). A macro may be defined as a single computing instruction that may expand automatically into a set of computing instructions to perform a particular task. Macros may be used to make sequences of computing instructions available as single program statements, which may make programming tasks less tedious and error-prone. In some instances, malicious macros, written in a macro language, may be added to the documents to infect target systems. Execution of the malicious macros in the documents may cause software and/or hardware to be infected, which may be harmful. Examples of macro languages in which malicious macros may written into documents may include Visual Basic for Applications, Javascript™, Microsoft Excel™ 4.0 Macro (which may also be termed XLM) and the like. In some instances, such macros may be embedded in documents corresponding to various types of applications, such as Microsoft Office™, Microsoft Excel™, Microsoft PowerPoint™, etc.

Security vendors may rely on a combination of static and dynamic analysis in order to identify documents having malicious macros, e.g., documents that have macros that may cause systems to become infected with malware. Malware may be defined as a virus, a worm, a Trojan horse, ransomware, spyware, adware, and/or the like. In the static analysis, some features, such as whether a document contains a macro, may be extracted from a document without opening the document in an actual application. In the dynamic analysis, documents may be opened in an application in a sandbox environment and the system may be monitored to capture any malicious behavior in the application. A sandbox environment may provide a tightly controlled set of resources within which programs may be run, such as storage and memory scratch space. The sandbox environment may provide a restricted space within which the documents may be opened (e.g., detonated) and for the macros to be executed such that determinations as to whether the macros are malicious may be determined without affecting software and/or hardware outside of the sandbox environment.

Documents may remain inside the sandbox environment for a relatively long period of time, e.g., around 30 seconds or more) to be detonated and monitored. However, static analysis may be performed within a few milliseconds. As a result, static analysis of the documents may significantly be faster than dynamic analysis of the documents. Some security vendors may use a hybrid approach in which static analysis is performed on a majority or all of the documents and a subset of those documents are detonated in sandbox environments in order to analyze the documents at scale. In many instances, however, a large number of documents that do not include malicious macros may be detonated in sandbox environments. For example, some security vendors may send every document that includes a macro to a sandbox environment for detonation. In typical instances, most macros are not malicious. A technical problem associated with conventional techniques for performing detection of documents having malicious macros may thus be that a substantial amount of computing and energy resources consumed to detonate and monitor the documents may be wasted on documents having macros that are benign.

Disclosed herein are apparatuses, methods, and computer-readable media for determining whether a document contains a malicious macro based on a code fingerprint of the document. The code fingerprint of the document may, in some examples, be a function call graph or tree of the macro. Particularly, a processor, as disclosed herein, may determine whether the code fingerprint of the document is within a predefined similarity level with respect to a cluster code fingerprint associated with a cluster of documents. For instance, the processor may determine which of a plurality of clusters of documents has a cluster code fingerprint that most closely matches the code fingerprint of the document. The processor may also determine whether the match between the most closely matching cluster code fingerprint and the code fingerprint meets the predefined similarity level.

Based on a determination that the code fingerprint of the document is within the predefined similarity level of the cluster code fingerprint, e.g., of the most closely matching cluster code fingerprint, the processor may determine whether the cluster of documents associated with the cluster code fingerprint has been identified as being malicious, benign, or unknown. An identification or label of a cluster of documents as being unknown may mean that it is unknown as to whether the cluster of documents is malicious or benign. In addition, based on a determination that the cluster of documents has been identified as being malicious or benign, the processor may handle the document as being malicious or benign while preventing or avoiding the sending of the document to a sandbox environment for detonation and monitoring. That is, the processor may handle the document as being malicious based on the cluster of documents having been labeled as being malicious or the processor may handle the document as being benign based on the cluster of documents having been labeled as being benign. However, based on a determination that the cluster of documents is labeled as being unknown, e.g., that the status of the cluster of documents being malicious or benign is unknown, the processor may send the document to the sandbox environment for detonation and monitoring.

As also disclosed herein, the processor may group a plurality of documents having macros into the clusters of documents based on the code fingerprints of the plurality of documents. Particularly, for instance, the processor may group the documents having code fingerprints that are within a predefined similarity level with respect to each other in common clusters of documents. The processor may also determine whether each of the clusters of documents is malicious, benign, or unknown.

Through implementation of the features of the present disclosure, when the code fingerprint of the document is determined to be within the predefined similarity level with respect to a cluster code fingerprint, the processor may determine whether the document is malicious or benign without first sending the document to the sandbox environment for detonation and monitoring of the document. Instead, the processor may determine whether the document is malicious or benign based on whether the cluster of documents associated with the similar cluster code fingerprint is malicious or benign. Additionally, the processor may send documents having code fingerprints that are not within the predefined similarity level with respect to any of the cluster code fingerprints or is within the predefined similarity level of a cluster code fingerprint of a cluster of documents identified as having an unknown label to the sandbox environment.

As a result, a significantly fewer number of documents may be sent to the sandbox environment for detonation and monitoring. This may enable the sandbox environment to be implemented efficiently. For instance, the number of documents that are detonated and monitored may significantly be reduced. A technical improvement afforded through implementation of the features of the present disclosure may thus be that energy and resource utilization may significantly be reduced in the detection of malicious documents without compromising detection of malicious documents having macros. These and additional technical improvements are discussed in the present disclosure.

Figure 2:
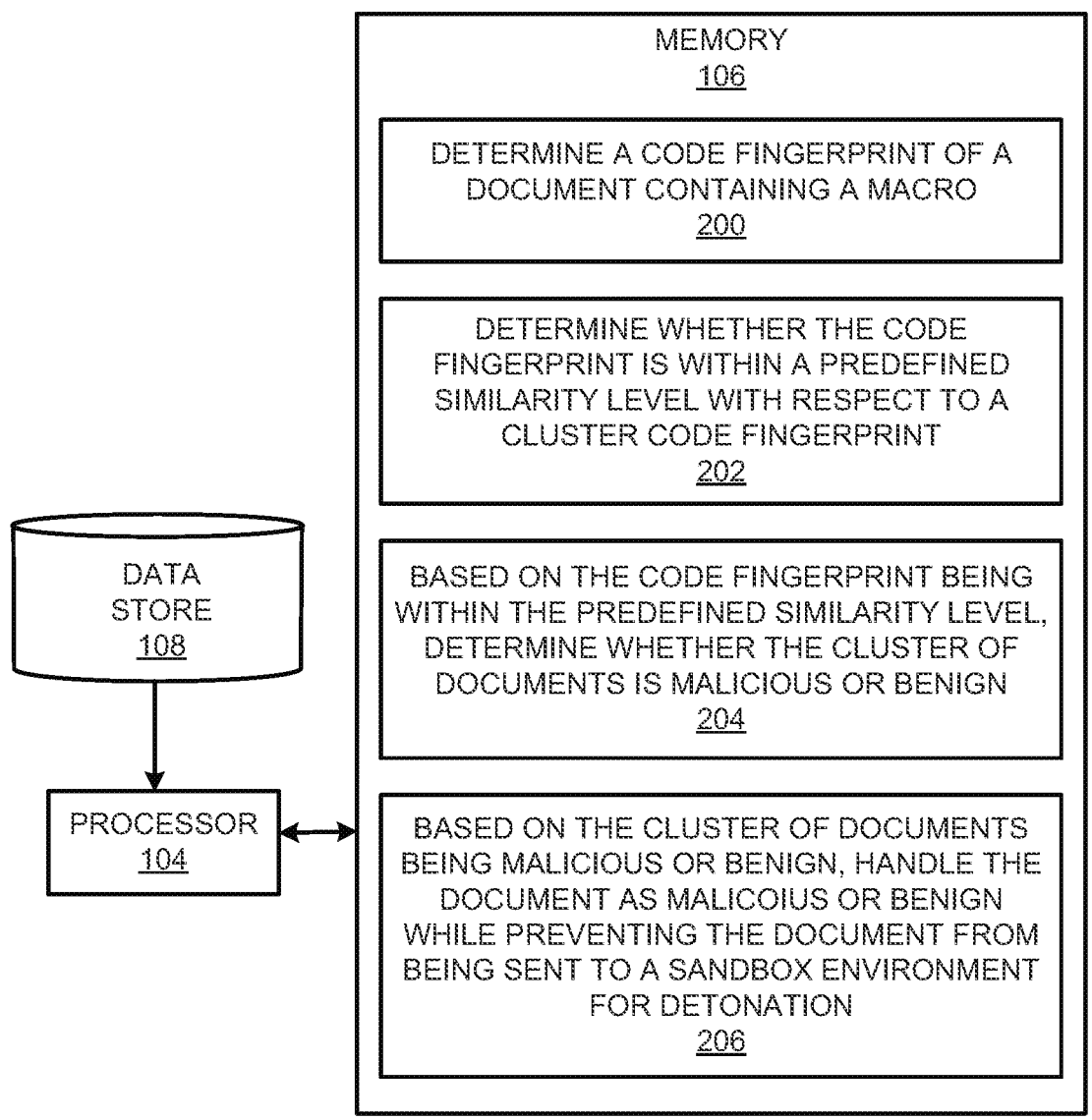
FIGS. 2-4, respectively, depict block diagrams of the apparatus depicted in FIG. 1, in accordance with embodiments of the present disclosure.

Reference is first made to FIGS. 1 and 2. FIG. 1 shows a block diagram of a network environment 100, in which an apparatus 102 may determine whether a document 120a containing a macro 122a is malicious or benign based on a code fingerprint 112 of the document 120a, and may handle the document 120a as being malicious or benign while preventing the document from being sent to a sandbox environment 150 based on a determination that the document 120a is malicious or benign, in accordance with an embodiment of the present disclosure. FIG. 2 depicts a block diagram of the apparatus 102 depicted in FIG. 1, in accordance with an embodiment of the present disclosure. It should be understood that the network environment 100 and/or the apparatus 102 may include additional features and that some of the features described herein may be removed and/or modified without departing from the scopes of the network environment 100 and/or the apparatus 102.

As shown in FIG. 1, the network environment 100 may include the apparatus 102, documents 120a-120n (in which the variable "n" may denote a value greater than one), a network 130, a network entity 140, and a sandbox environment 150. The apparatus 102 may be a computing device such as a server, a laptop computer, a desktop computer, a tablet computer, and/or the like. In particular examples, the apparatus 102 is a server on the cloud. In some examples, functionalities of the apparatus 102 may be spread over multiple apparatuses 102, multiple virtual machines, and/or the like. The network 130 may be an internal network, such as a local area network, an external network, such as the Internet, or a combination thereof.

As shown in FIGS. 1 and 2, the apparatus 102 may include a processor 104 that may control operations of the apparatus 102. Thus, for instance, references made herein to the apparatus 102 performing various operations should equivalently be construed as meaning that the processor 104 of the apparatus 102 is performing those various operations. The apparatus 102 may also include a memory 106 on which instructions that the processor 104 may access and/or may execute may be stored. In addition, the processor 104 may include a data store 108 on which the processor 104 may store and access various information as discussed herein. The processor 104 may be a semiconductor-based microprocessor, a central processing unit (CPU), an application specific integrated circuit (ASIC), a field-programmable gate array (FPGA), and/or other hardware device.

The memory 106 and the data store 108, which may also each be termed a computer readable medium, may each be, for example, a Random Access memory (RAM), an Electrically Erasable Programmable Read-Only Memory (EEPROM), a storage device, or the like. The memory 106 and/or the data store 108 may be a non-transitory computer readable storage medium, where the term "non-transitory"

does not encompass transitory propagating signals. In any regard, the memory 106 may have stored thereon machine-readable instructions that the processor 104 may execute. The data store 108 may have stored thereon data that the processor 104 may enter or otherwise access.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and/or multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

According to examples, the documents 120a-120n may each be a document that may be communicated from a computing device, such as a user's laptop computer, smartphone, desktop computer, or the like, to another computing device, such as another user's computing device. By way of particular example, the documents 120a-120n may be documents attached to electronic mail, e.g., emails, communicated from one user's computing device to another user's computing device. In other examples, the documents 120a-120n may each be a document that may be communicated between a computing device and a storage location, such as a cloud-based storage device. In this regard, the documents 120a-120n may be communicated from a computing device to a storage location and/or from a storage location to a computing device.

According to examples, the documents 120a-120n may each be a type of document within which macros 122a-122n may be written or otherwise contained. As discussed herein, a macro 122a may be defined as a single computing instruction that may expand automatically into a set of computing instructions to perform a particular task. In some instances, malware may be written in a macro language such as Visual Basic for Applications, Javascript™, Microsoft Excel™, and the like, to infect the document. A document containing a malicious macro 122a may be termed a malicious document herein. In some instances, such macros may be embedded in documents corresponding to various types of applications, such as Microsoft Office™, Microsoft Excel™, Microsoft PowerPoint™, etc.

According to examples, the documents 120a-120n may be communicated through the network entity 140 or other network appliances in order to reach an intended recipient or destination. In other examples, the network entity 140 may be a data collector device that may be connected to network devices such as switches, routers, hosts, and/or the like. The network entity 140 may be a server or other device that may collect the data in any suitable manner. In addition or in other examples, the network entity 140 may be a switch, router, host, server, firewall, and/or the like.

In some examples, the network entity 140 may collect data such as source addresses, destination addresses, source ports, destination ports, and/or the like pertaining to the communication of the documents 120a-120n in the network environment 100. The network entity 140 may also collect data pertaining to geographic locations at which communication of the documents 120a-120n occurred, the dates and times at which the documents 120a-120n were communicated, the types of applications through which the documents 120a-120n were communicated, and/or the like. The geographic locations may include, for instance, the countries, states, localities, cities, and/or the like from which the communication of the documents 120a-120n originated.

In some examples, the network entity 140 may intercept the documents 120a-120n as they are communicated through a network device, such as a router, switch, hub, firewall, or the like. In some examples, the network entity 140 may intercept the documents 120a-120n as they are communicated through the network entity 140, e.g., in instances in which the network entity 140 is a router, switch, hub, firewall, or the like. By way of particular example in which the documents 120a-120n are attachments to emails, the network entity 140 may be an email server through which all of the emails directed to users in an organization may be analyzed for potential malware.

In any of these examples, the network entity 140 may send the intercepted documents 120a-120n to the apparatus 102 via the network 130. In some examples, the network entity 140 may intercept and send each of the documents 120a-120n to the apparatus 102. In other examples, the network entity 140 may determine whether the intercepted documents 120a-120n contain macros 122a-122n and may send the documents 120a-120n that contain macros 122a-122n to the apparatus 102. In these examples, the network entity 140 may not send documents that do not contain macros to the apparatus 102. Instead, the network entity 140 may permit those documents that do not contain macros to be sent to their respective destinations.

In some examples, the apparatus 102 and the network entity 140 may be an integrated component. That is, the apparatus 102 and the network entity 140 may form a single device. In these examples, the apparatus 102/network entity 140 may intercept and analyze the documents 120a-120n as discussed herein. For instance, the apparatus 102/network entity 140 may determine whether the intercepted documents 120a-120n include macros 122a-122n and for those documents 120a-120n determined to include macros 122a-122n, the apparatus 102/network entity 140 may determine whether the documents 120a-120n are malicious as discussed herein.

According to examples, the apparatus 102 and/or the network entity 140 may perform malware detection on the documents 120a-120n in addition to the operations discussed herein. For instance, the apparatus 102 and/or the network entity 140 may determine whether documents that do not contain macros are malicious. The apparatus 102 and/or the network entity 140 may execute any suitable malware detection technique to make these determinations.

According to examples, the apparatus 102 and/or the network entity 140 may determine whether the documents 120a-120n respectively contain macros 122a-122b without opening the documents 120a-120n. For instance, the apparatus 102 and/or the network entity 140 may determine whether the document contains a macro by analyzing the respective codes of the documents 120a-120n without opening the documents 120a-120n in the applications within which the documents 120a-120n are intended to be opened.

As shown in FIG. 2, the memory 106 may have stored thereon machine-readable instructions 200-208 that the processor 104 may execute. As shown, the processor 104 may execute the instructions 200 to determine a code fingerprint 112 of a document 120a containing a macro 122a. In some examples, the document 120a may be communicated from a first computing device to a second computing device, from a computing device to a data storage device, from a data storage device to a computing device, etc. By way of particular example, the document 120a may be an attachment to an email communicated to a user within an organization that the apparatus 102 and/or network entity 140 may intercept.

According to examples, the code fingerprint 112 of the document 120a may correspond to a functionality of the macro 122a. For instance, the code fingerprint 112 may capture the overall functionality of the macro 122a, abstracting details such as starting points, relative locations of function definitions, variable names, etc. In other words, the code fingerprint 112 may be an abstract representation of the code of the macro 122a that captures the overall functionality of the macro 122a. In addition or alternatively, the code fingerprint 112 may capture calls made by functions in the macro 122a to other functions, which may be internal functions or external functions. In some examples, the code fingerprint 112 may be a function call graph of the macro 122a. A function call graph, or equivalently, a control-flow graph or a call tree, may represent calling relationships between subroutines in the macro 122a. The code fingerprint 112 may represent the function call graph of the macro in which all possible entry points were abstracted as only one entry point and the locations of the functions within the macro program are ignored. The resulting graph may be a weighted graph in which nodes representing built-in or API functions may have more weight than user-defined functions.

By way of particular example, in Excel™ 4.0 macros, macrosheets may first be ordered in an Excel™ document based on dependencies between formulas in the macros. Then, a function call graph may be created from (col, row)-sorted formulas in the macrosheets. As another example, in a visual basic for application macro, a function call graph may be constructed from all of the procedures that are reachable from predefined sub procedures in the visual basic for application macro, such as Workbook_Open.

According to examples, the processor 104 may determine the code fingerprint 112 of the document 120a without opening the document 120a. That is, for instance, the processor 104 may determine the code fingerprint 112 of the document 120a by analyzing the code of the documents 120a without opening the document 120a in the application within which the document 120a is intended to be opened.

The processor 104 may execute the instructions 202 to determine whether the code fingerprint 112 of the document 120a is within a predefined similarity level with respect to a cluster code fingerprint 114 associated with a cluster of documents 116. According to examples and as discussed herein, a plurality of clusters of documents 116 may be generated, in which the documents in the respective clusters of documents 116 may have code fingerprints that are similar with respect to each other. In other words, each of the documents in a particular cluster of documents 116 may have a code fingerprint that is within a predefined similarity level with respect to code fingerprints of the other documents in the particular cluster of documents 116.

The similarity level may be a measure of how similar the code fingerprints are to each other and may be determined in any suitable manner. For instance, the similarity level between a first code fingerprint and a second code fingerprint may be determined through a comparison of the function calls identified in the first and second code fingerprints. In this example, the first code fingerprint may be determined as being within the predefined similarity level with respect to the second code fingerprint when they share, for instance, some predefined threshold level of common call functions. In addition or alternatively, the first code fingerprint may be determined as being within the predefined similarity level with respect to the second code fingerprint when they share, for instance, some predefined threshold level of similarity between the function call graphs of the first and second code fingerprints, e.g., the similarity level between relationships between call functions in the first and second code fingerprints. The predefined threshold level may be user-defined, based on testing, determined through modeling, and/or the like.

In some examples, the processor 104 may generate the clusters of documents 116 and may store identifications of the clusters of documents 116 in the data store 108. The processor 104 may also determine a cluster code fingerprint 114 for each of the clusters of documents 116. In some examples, the processor 104 may determine the cluster code fingerprint 114 for a cluster of documents 116 as being the code fingerprint of one of the documents in the cluster of documents 116. For instance, the processor 104 may select the code fingerprint of a particular one of the documents, may randomly select one of the code fingerprints, or may apply another technique to select one of the code fingerprints to set as the cluster code fingerprint 114 for the cluster of documents 116. The processor 104 may also store cluster code fingerprints 114 of each of the clusters of documents 116 in the data store 108. In addition or other examples, the processor 104 may determine the cluster code fingerprint 114 for each of the clusters of documents 116, e.g., label each of the clusters of documents 116, through application of a predefined policy on the clusters of documents 116 as discussed herein.

In some examples, in order to determine whether the code fingerprint 112 of the document 120a is within a predefined similarity level with respect to a cluster code fingerprint 114 associated with a cluster of documents 116, the processor 104 may compare the code fingerprint 112 of the document 120a with the cluster code fingerprints 114 stored in the data store 108. The processor 104 may implement any suitable similarity detection technique to determine whether the code fingerprint 112 matches is within the predefined similarity level with respect to the cluster code fingerprints 114. For instance, the processor 104 may compare the relationships between function calls identified in the code fingerprint 112 against the relationships between function calls identified in the cluster code fingerprints 114. The processor 104 may also determine that the code fingerprint 112 is within the predefined similarity level with respect to one of the cluster code fingerprints 114 when they share, for instance, some predefined threshold level of common call function structures. The predefined threshold level may be user-defined, based on testing, determined through modeling, and/or the like.

The processor 104 may execute the instructions 204 to, based on a determination that the code fingerprint 112 is within or meets the predefined similarity level with respect to the cluster code fingerprint 114 associated with a cluster of documents 116, determine whether the cluster of documents 116 has been identified being malicious or benign. As discussed herein, determinations as to whether the clusters of documents 116 are malicious or benign may have previously been made and these statuses 118 (or labels) of the clusters of documents 116 may have been stored in the data store 108. According to examples, the processor 104 may determine that a cluster of documents 116 is malicious when the cluster of documents 116 includes a malicious document, at least a predefined number of malicious documents, has at least a predefined number of documents, is growing at a predefined rate or faster, and/or the like. The processor 104 may similarly determine that a cluster of documents 116 is benign when the cluster of documents 116 includes only benign documents, has less than the predefined number of documents, is not growing at the predefined rate, and/or the like. The processor 104 may also determine that the cluster of documents 116 is malicious or benign based on receipt of an indication by a user, e.g., an analyst, that the cluster of documents 116 as to whether the cluster of documents 116 is malicious or benign.

In some examples, the processor 104 may compare the code fingerprint 112 of the document 120a against each of the cluster code fingerprints 114 of respective clusters of documents 116. Based on the comparison, the processor 104 may determine which of the cluster code fingerprints 114 most closely matches the code fingerprint 112 of the document 120a. In some examples, the processor 104 may assign the document 120a with the label assigned to the cluster of documents 116 having the cluster code fingerprint 114 that most closely matches the code fingerprint 112 of the document 120a. In other examples, the processor 104 may determine whether a match between the most closely matching cluster code fingerprint 114 and the code fingerprint 112 is within the predefined similarity threshold. If so, the processor 104 may assign the document 120a with the label assigned to the cluster of documents 116 having the cluster code fingerprint 114 that most closely matches the code fingerprint 112 of the document 120a. If not, the processor 104 may determine that the label for the document 120a may not be determined based on the comparison and may send the document 120a to the sandbox environment 150 for detonation and monitoring.

The processor 104 may execute the instructions 206 to, based on a determination that the cluster of documents 116 having the cluster code fingerprint 114 that is similar to the code fingerprint 112 of the document 120a has been identified as being malicious or benign, handle the document 120a as being malicious or benign while preventing the document 120a from being sent to the sandbox environment 150 for detonation of the document 120a. The processor 104 may handle the document 120a as being malicious by moving the document 120a to a secure location, e.g., by quarantining the document 120a, blocking the document 120a from being sent to an intended recipient of the document 120a, sending the document 120a to a junk folder of a user's email account, etc. The processor 104 may handle the document 120a as being benign by forwarding the document 120a to an intended recipient of the document 120a. In addition, the processor 104 may forward the document 120a to the intended recipient without first sending the document 120a to the sandbox environment for detonation of the document 120a.

According to examples, the sandbox environment 150 may provide a tightly controlled set of resources within which applications that may open the document 120a may be run, such as storage and memory scratch space. The sandbox environment 150 may provide a restricted space within which the document 120a may be opened (e.g., detonated) and for the macro 122a in the document 120a to be executed such that determinations as to whether the macro 122a is malicious may be determined without affecting software and/or hardware outside of the sandbox environment 150.

According to examples, when the code fingerprint 112 of the document 120a is determined to be within the predefined similarity level with respect to a cluster code fingerprint 114, a determination may be made as to whether the document 120a is malicious or benign without sending the document 120a to the sandbox environment 150 for detonation and monitoring of the document 120a. As a result, a fewer number of documents may be sent to the sandbox environment 150 for detonation and monitoring, which may enable the sandbox environment 150 to be implemented efficiently. For instance, the number of documents that are detonated and monitored may significantly be reduced, which may conserve energy and resource utilization.

Figure 3:
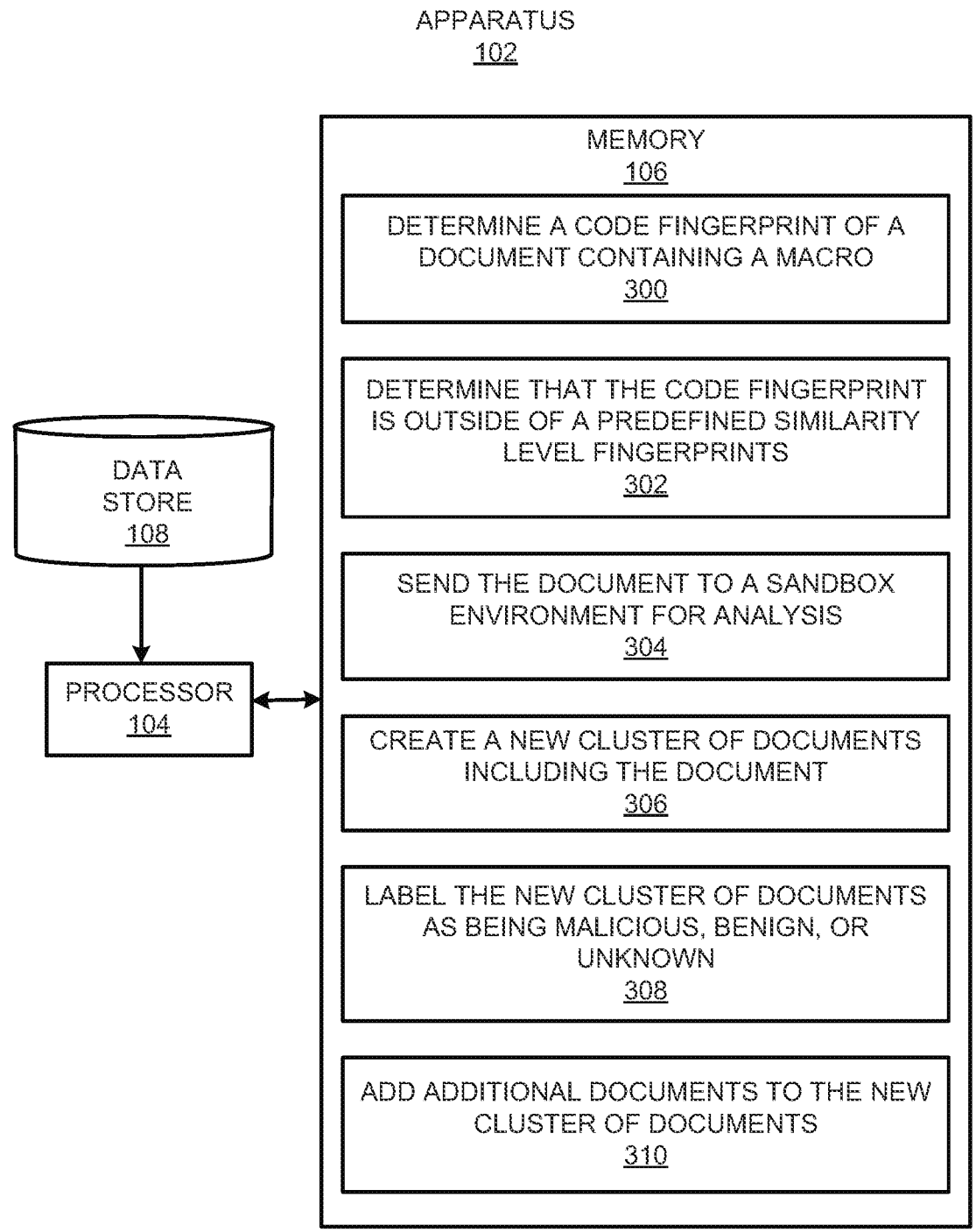

However, in instances in which the code fingerprint 112 is outside of the predefined similarity level with respect to the cluster code fingerprints 114, the processor 104 may execute an additional set of instructions. Reference is now made to FIG. 3, which depicts a block diagram of the apparatus 102 depicted in FIG. 1, in accordance with an embodiment of the present disclosure. It should be understood that the apparatus 102 may include additional features and that some of the features described herein may be removed and/or modified without departing from the scope of the apparatus 102.

As shown in FIG. 3, the memory 106 may have stored thereon machine-readable instructions 300-310 that the processor 104 may execute. According to examples, the processor 104 may execute the instructions 300-310 prior to, in conjunction with, or after execution of the instructions 200-208 discussed above with respect to FIG. 2. In other examples, the processor 104 may execute the instructions 300-310 as a completely separate set of instructions from the instructions 200-208.

As shown, the processor 104 may execute the instructions 300 to determine a code fingerprint 112 of a document 120a containing a macro 122a. The processor 104 may determine the code fingerprint 112 of the document 120a in any of the manners discussed above with respect to the instructions 200.

The processor 104 may execute the instructions 302 to determine that the code fingerprint 112 of the document 120a is outside of a predefined similarity level with respect to the cluster code fingerprints 114 of the clusters of documents 116.

The processor 104 may execute the instructions 304 to, based on a determination that the code fingerprint 112 of the document 120a is outside of the predefined similarity level with respect to the cluster code fingerprints 114, send the document 120a to be detonated in the sandbox environment 150. In addition, the processor 104 may determine whether the document 120a is malicious or benign based on an analysis of the document 120a following detonation of the document 120a in the sandbox environment 150.

The processor 104 may execute the instructions 306 to create a new cluster of documents 116 including the document 120a. Initially, the new cluster of documents 116 may only include the document 120a.

The processor 104 may execute the instructions 308 to label the new cluster of documents 116 as malicious, benign, or unknown based on application of a predefined policy on the new cluster of documents. The predefined policy may be that the processor 104 may label the new cluster of documents 116 according to the whether the document 120a has been determined to be malicious or benign. That is, the processor 104 may label the cluster of documents 116 as being malicious based on the document 120a having been determined as being malicious or may label the new cluster of documents 116 as being benign based on the document 120a having been determined as being benign. The processor 104 may also store the new cluster of documents, the cluster code fingerprint of the new cluster of documents, and the status of the new cluster of documents in the data store 108. In other examples, the predefined policy may be based on properties of the new cluster, such as the number of documents in the cluster, the rate at which the new cluster is growing, etc. In some examples, the predefined policy may be for the processor 104 to automatically determine whether the cluster of documents is malicious, benign, or unknown. For instance, the processor 104 may automatically determine that the cluster of documents is malicious when the cluster of documents has greater than a certain number of documents and that a certain percentage of those documents are malicious. In other examples, the predefined policy may be for the processor 104 to send the new cluster of documents to a user, e.g., an analyst, to determine the label for the new cluster.

The processor 104 may execute the instructions 310 to add additional documents having code fingerprints that are within the predefined similarity level with respect to the cluster code fingerprint 114 of the new cluster of documents into the new cluster of documents.

As discussed herein, those documents 120b-120n for which malicious or benign statuses are unknown may be sent to the sandbox environment 150 for analysis of the documents 120b-120n. Particularly, those documents 120b-120n may be sent to the sandbox environment 150 for detonation and monitoring. While in the sandbox environment 150, the documents 120b-120n may be opened by their corresponding applications, which may include execution of the macros 122b-122n. In addition, the documents 120b-120n and the macros 122b-122n may be monitored to determine whether they exhibit any potentially malicious behavior. The processor 104 may determine that the documents 120b-120n and, particularly, the macros 122b-122n, exhibit potentially malicious behavior based on any suitable determination technique. For instance, a document 120b may be determined to be malicious when the functionality, e.g., the calling relationships between subroutines, of the macro 122b in the document 120b matches the functionality of a known malicious macro. As another example, a document 120b may be determined to be malicious when the macro 122b attempts to perform a subroutine that is known to be malicious or otherwise irregular. By way of particular example, the document 120b may be determined to be malicious when the macro 122b attempts to perform a routine that does not correspond to routines that are normally performed by similar types of macros 122b.

Figure 4:
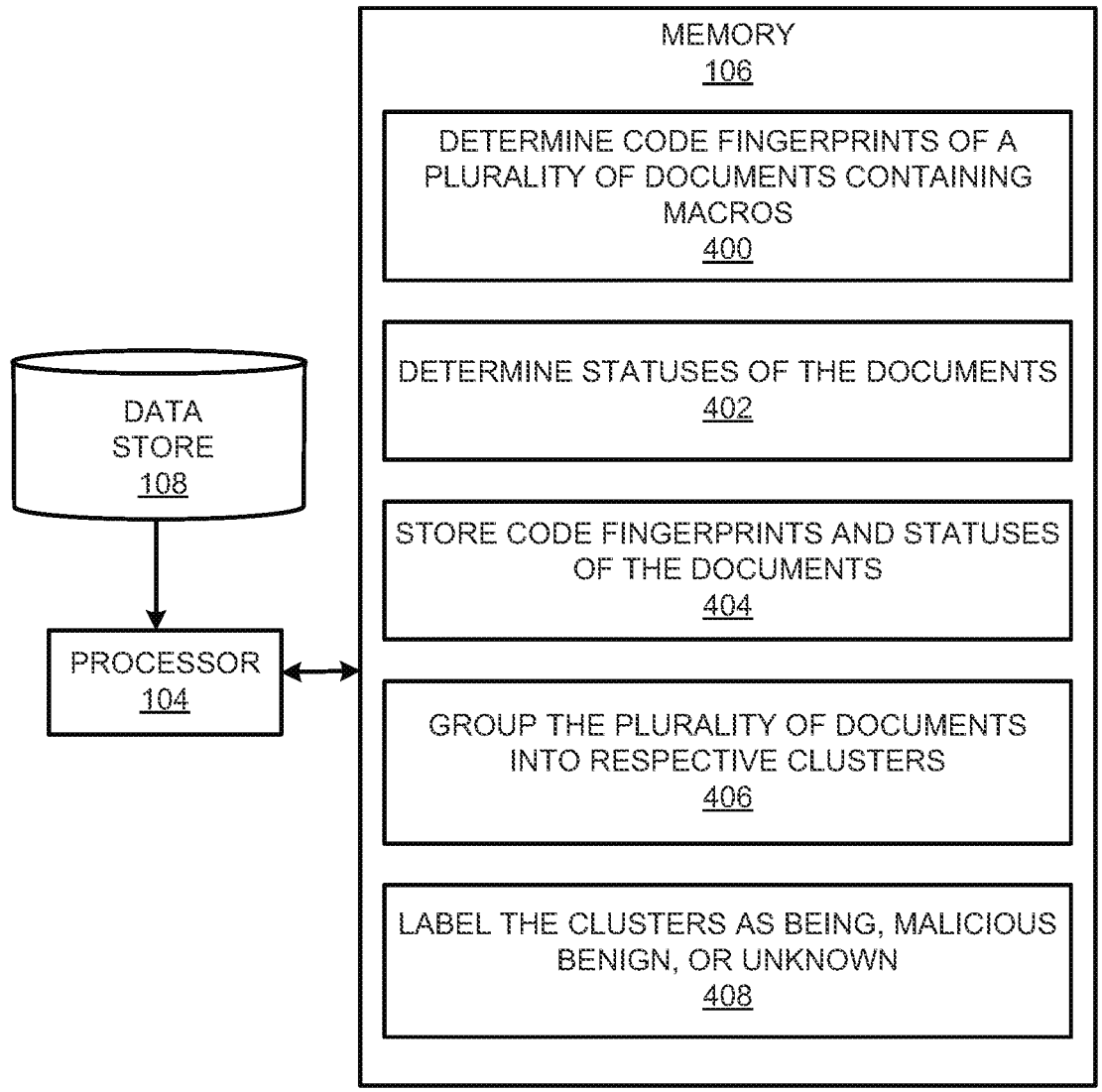

Reference is now made to FIG. 4, which depicts a block diagram of the apparatus 102 depicted in FIG. 1, in accordance with an embodiment of the present disclosure. It should be understood that the apparatus 102 may include additional features and that some of the features described herein may be removed and/or modified without departing from the scope of the apparatus 102.

As shown in FIG. 4, the memory 106 may have stored thereon machine-readable instructions 400-408 that the processor 104 may execute. According to examples, the processor 104 may execute the instructions 400-408 prior to, in conjunction with, or after execution of the instructions 200-208 and/or 300-310 discussed above with respect to FIGS. 2 and 3. In other examples, the processor 104 may execute the instructions 400-408 as a completely separate set of instructions from the instructions 200-208 and/or 300-310.

The processor 104 may execute the instructions 400 to determine code fingerprints of a plurality of documents 120b-120n containing macros 122b-122n. For instance, the processor 104 may determine the code fingerprints of a plurality of documents 120b-120n that the processor 104 may have received during a certain period of time. The certain period of time may be a few hours, a few days, a few weeks, etc.

The processor 104 may execute the instructions 402 to determine statuses of the documents 120b-120n. Particularly, the processor 104 may determine whether the documents 120b-120n are malicious or benign. In some examples, the processor 104 may send the documents 120b-120n to the sandbox environment 150 for the documents 120b-120n to be opened and monitored. The processor 104 may determine whether the documents 120b-120n are malicious or benign based on the monitoring performed in the sandbox environment 150.

The processor 104 may execute the instructions 404 to store the code fingerprints of the documents 120b-120n and the statuses of the documents 120b-120n, for instance, in the data store 108.

The processor 104 may execute the instructions 406 to group the documents 120b-120n into clusters of documents 116 based on the code fingerprints of the documents 120b-120n. That is, the processor 104 may group the documents 120b-120n having code fingerprints that are within a predefined similarity level with respect to each other into the same cluster of documents 120b-120n. The processor 104 may further determine and store the cluster code fingerprints 114 of the clusters of documents 116, for instance, in the data store 108. In some examples, the cluster code fingerprint 114 for a cluster of documents 116 may be equivalent to the code fingerprint 112 of one of the documents 120b in the cluster of documents 116 as discussed herein.

The processor 104 may execute the instructions 408 to label the clusters of documents 116 as being malicious, benign, or unknown. The processor 104 may label a cluster of documents 116 as being malicious if the cluster includes a document that has been identified as being malicious and/or if an analyst determines that the cluster is malicious. Likewise, the processor 104 may label a cluster of documents 116 as being benign if the cluster does only includes documents that have been identified as being benign and/or if an analyst determines that the cluster is benign. The processor 104 may label a cluster of documents 116 as being unknown if the cluster includes both malicious and benign clusters and/or if an analyst determines that the status of the cluster is unknown. In some examples, the processor 104 may change the label assigned to the clusters of documents 116, for instance, when an analyst determines that the status is to be changed. The processor 104 may store the statuses (e.g., labels) of the clusters of documents 116, for instance, in the data store 108.

According to examples, the processor 104 may apply a predefined policy on the clusters of documents 116 to determine whether additional analysis is to be performed to determine whether the clusters of documents 116 are malicious or benign. For instance, the processor 104 may determine whether a cluster of documents 116 is malicious even though none of the documents in the cluster of documents 116 has been identified as being malicious. In some examples, application of the predefined policy may cause the processor 104 to determine whether any of the clusters of documents 116 meets a deterministic threshold. The processor 104 may cause those clusters of documents 116 that meet the deterministic threshold to be marked for further review. For instance, the processor 104 may send the clusters of documents 116 that meet the deterministic threshold to a policy engine (not shown) that may review the clusters of documents 116.

The policy engine may use both cluster information, such as growth rate, size, etc., along with results from an application that may examine the behavior of software to determine whether the software is malicious, to determine whether the clusters of documents 116 may be marked as being malicious or benign. The policy engine may also determine whether such a determination may not be made and that an analyst is to make the determination. In this case, the policy engine or the processor 104 may send the clusters of documents 116 to an analyst to make the determination. In one regard, the additional analysis of the clusters of documents 116 may make determinations of whether the clusters of documents 116 are malicious resistant against minor changes to the macro codes, such as relocating code, changing procedure order, adding dangling procedures, and/or the like.

According to examples, the deterministic threshold may be based on a size of a cluster of documents, a rate at which a cluster of documents is growing, a percentage of malicious documents out of a total number of documents in a cluster of documents, other features of the documents in the cluster, and/or the like. For instance, the processor 104 may determine that a cluster of documents 116 meets the deterministic threshold based on a determination that the size of the cluster of documents 116 exceeds a predefined size. As another example, the processor 104 may determine that a cluster of documents 116 meets the deterministic threshold based on determination that the size of the cluster of documents 116 is increasing at a rate that exceeds a predefined rate. In any of these examples, the deterministic threshold may be user defined, based on historical data, based on modeling, and/or the like.

In any of the examples discussed above, the policy engine and/or the analyst may provide the processor 104 with the statuses of the clusters of documents 116 that meet the deterministic threshold. The processor 104 may also store the statuses of the clusters of documents 116 in the data store. According to examples, the processor 104 may determine that a certain cluster of documents in the clusters of documents 116 meets a predefined policy. Based on a determination that the certain cluster of documents meets the predefined policy, the processor 104 may output a request to a user, e.g., an analyst, to determine whether the certain cluster of documents is malicious, benign, or unknown. The processor 104 may also receive a response from the user as to whether the certain cluster of documents is malicious, benign, or unknown. In addition, the processor 104 may label the certain cluster of documents as being malicious, benign, or unknown based on the received response.

In addition, the processor 104 may compare the code fingerprints of newly received documents against the cluster code fingerprints 114 to determine whether the documents are malicious or benign. The processor 104 may also create new clusters of documents as discussed herein.

Although the instructions 200-208, 300-310, and 400-408 are described herein as being stored on the memory 106 and may thus include a set of machine-readable instructions, the apparatus 102 may include hardware logic blocks that may perform functions similar to the instructions 200-208, 300-310, and/or 400-408. For instance, the processor 104 may include hardware components that may execute the instructions 200-208, 300-310, and 400-408. In other examples, the apparatus 102 may include a combination of instructions and hardware logic blocks to implement or execute functions corresponding to the instructions 200-208, 300-310, and 400-408. In any of these examples, the processor 104 may implement the hardware logic blocks and/or execute the instructions 200-208, 300-310, and 400-408. As discussed herein, the apparatus 102 may include additional instructions and/or hardware logic blocks such that the processor 104 may execute operations in addition to or in place of those discussed above with respect to FIGS. 2, 3, and/or 4.

Figure 5A:
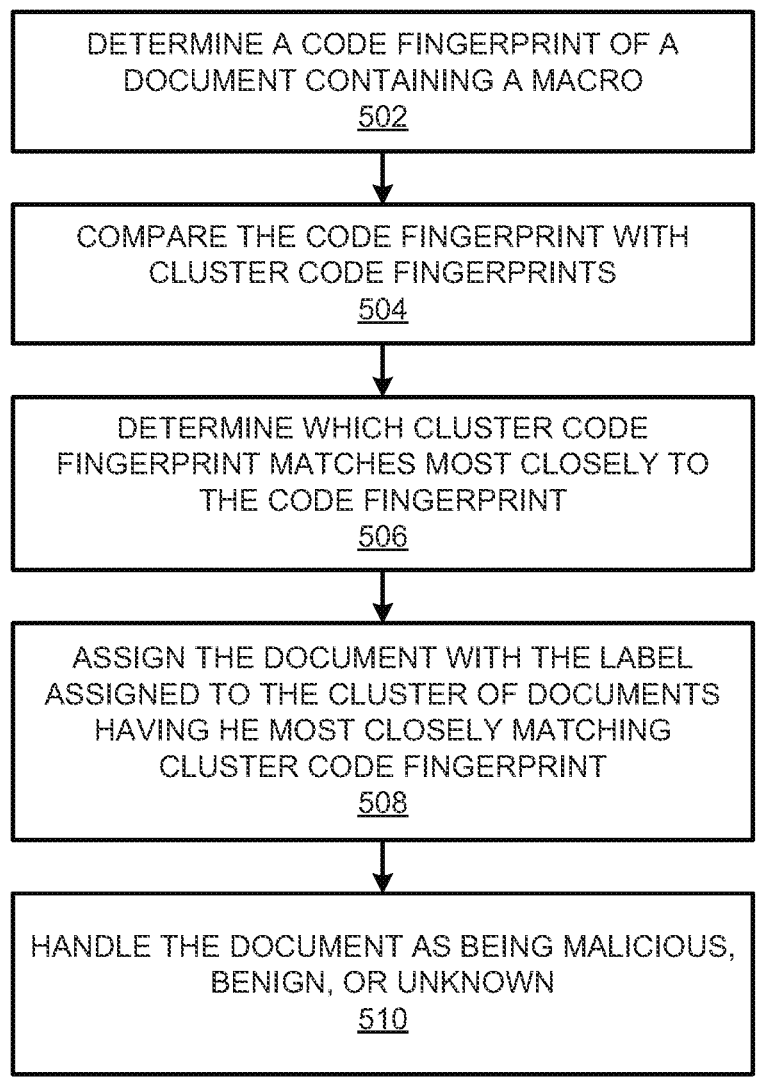
FIGS. 5A and 5B, respectively, depict flow diagrams of methods for determining whether a document containing a macro is malicious, benign, or unknown based on a code fingerprint of the document, and handling the document as being malicious, benign, or unknown based on a determination that the document is malicious, benign, or unknown, in accordance with an embodiment of the present disclosure.
Figure 5B:
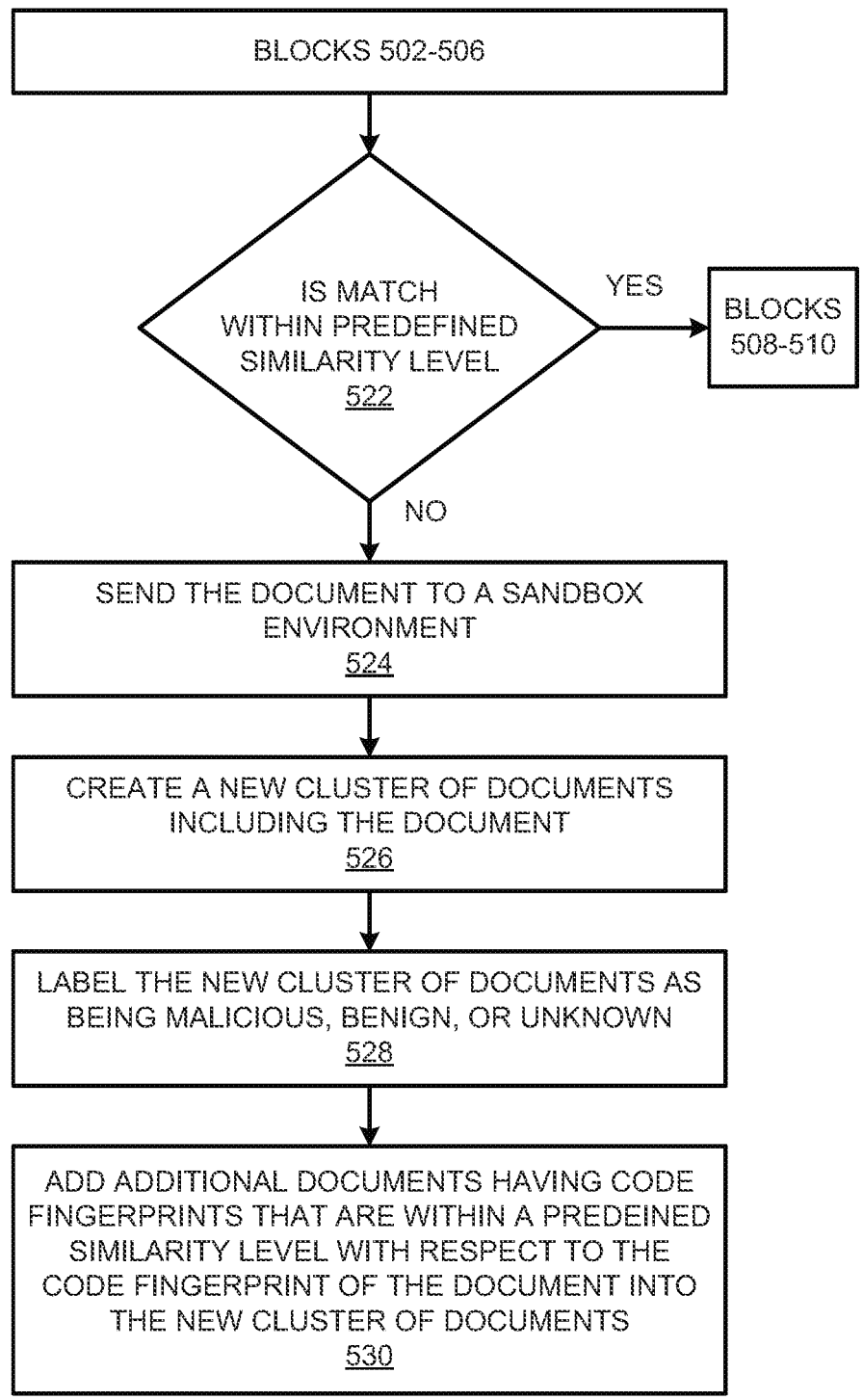
Figure 6:
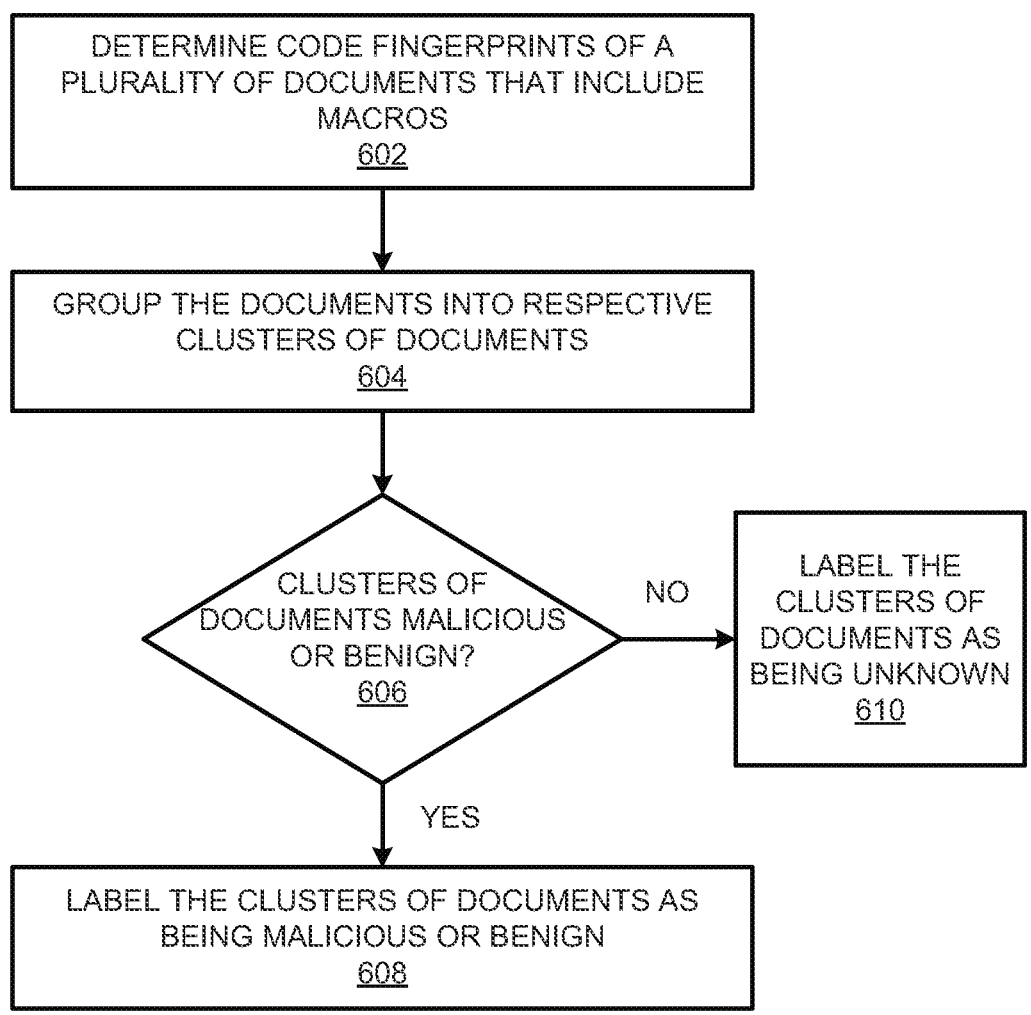
FIG. 6 depicts a flow diagram of a method for grouping and labeling clusters of documents as being malicious, benign, or unknown, in accordance with an embodiment of the present disclosure.

Various manners in which the processor 104 of the apparatus 102 may operate are discussed in greater detail with respect to the methods 500 and 600 depicted in FIGS. 5A, 5B, and 6. Particularly, FIGS. 5A and 5B, respectively, depict flow diagrams of methods 500 and 520 for determining whether a document 120*a* containing a macro 122*a* is malicious, benign, or unknown based on a code fingerprint 112 of the document 120*a*, and handling the document 120*a* as being malicious, benign, or unknown based on the assigned label of the document, in accordance with an embodiment of the present disclosure. FIG. 6 depicts a flow diagram of a method 600 for grouping and labeling clusters of documents 116 as being malicious, benign, or unknown, in accordance with an embodiment of the present disclosure. It should be understood that the methods 500, 520, and 600 may include additional operations and that some of the operations described therein may be removed and/or modified without departing from the scopes of the methods 500, 520, and 600. The descriptions of the methods 500, 520, and 600 are made with reference to the features depicted in FIGS. 1-4 for purposes of illustration.

With reference first to FIG. 5A, at block 502, the processor 104 may determine a code fingerprint 112 of a document 120*a* containing a macro 122*a*. As discussed herein, the code fingerprint 112 of the document 120*a* may correspond to a functionality of the macro 122*a*. In some examples, the functionality of the macro 122*a* may be determined from a code of the macro 122*a*. In some examples, the functionality of the macro 122*a* may include the calling relationships between subroutines in the macro 122*a*. As also discussed herein, the processor 104 may determine the code fingerprint 112 of the document 120*a* through an analysis of the code of the macro 122*a* without opening the document 120*a* or executing the macro 122*a*.

At block 504, the processor 104 may compare the code fingerprint 112 of the document 120*a* with cluster code fingerprints 114 associated with clusters of documents 116. As discussed herein, each of the clusters of documents 116 may be labeled as being malicious, benign, or unknown. In addition, at block 506, the processor 104 may determine, based on the comparison, which of the cluster code fingerprints matches most closely to the code fingerprint 112 of the document 120. For instance, the processor 104 may compare the relationships between function calls identified in the code fingerprint 112 against the relationships between function calls identified in the cluster code fingerprints 114 to determine the level of match between the code fingerprint 112 and the cluster code fingerprints 114.

At block 508, the processor 104 may assign the document 120*a* with the label assigned to the cluster of documents 116 having the cluster code fingerprint 114 that matches most closely to the code fingerprint 112 of the document 120*a*. In addition, at block 510, the processor 104 may handle the document 120*a* as being malicious, benign, or unknown based on the assigned label of the document 120*a*.

With reference now to FIG. 5B, following execution of blocks 502-506, at block 522, the processor 104 may determine whether the cluster code fingerprint that matches most closely to the code fingerprint 112 of the document 120*a* matches the code fingerprint 112 within a predefined similarity level. In other words, the processor 104 may determine whether the match between the most closely matching cluster code fingerprint and the code fingerprint 112 is within the predefined similarity level. Based on a determination that the match is within the predefined similarity level, the processor 104 may execute blocks 508 and 510.

However, based on a determination that the match between the most closely matching cluster code fingerprint and the code fingerprint 112 is outside of the predefined similarity level, at block 524, the processor 104 may send the document 120a to a sandbox environment 150 to determine whether the document 120a is malicious or benign. As discussed herein, the processor 104 may also send the document 120a to the sandbox environment 150 based on a determination that the cluster of documents having the cluster code fingerprint that most closely matches the code fingerprint 112 being labeled as unknown.

At block 526, the processor 104 may create a new cluster of documents including the document 120a. At block 528, the processor 104 may label the new cluster of documents as being malicious, benign, or unknown based on application of a predefined policy on the new cluster of documents. As discussed herein, the predefined policy may include the label assigned to the document 120a, properties of the new cluster, an analyst input, and/or the like. At block 530, the processor 104 may add additional documents having code fingerprints that are within the predefined similarity level with respect to the code fingerprint of the document into the new cluster of documents. The processor 104 may also store the new cluster of documents and the label assigned to the new cluster of documents in the data store 108.

Reference is now made to FIG. 6. At block 602, the processor 104 may determine code fingerprints of a plurality of documents 120b-120n containing macros 122b-122n. For instance, the processor 104 may determine the code fingerprints of a plurality of documents 120b-120n that the processor 104 may have received during a certain period of time. The certain period of time may be a few hours, a few days, a few weeks, etc.

At block 604, the processor 104 may group the plurality of documents into respective clusters of documents 116. The processor 104 may group the plurality of documents according to the code fingerprints of the documents. Particularly, the processor 104 may group documents having code fingerprints that are within a predefined similarity level with respect to the code fingerprints of other documents into the same clusters of documents 116. In some instances, the processor 104 may group the documents into the cluster of documents with which the documents have the greatest level of similarity. In some instances, the processor 104 may group some of the documents into multiple ones of the clusters of documents, e.g., in instances in which the documents have similar or the same level of similarity to multiple ones of the clusters of documents.

At block 606, the processor 104 may determine each of the clusters of documents 116 is malicious or benign based on application of a predefined policy on the clusters of documents 116. The processor 104 may make this determination in any of the manners discussed herein. For instance, the processor 104 may make this determination based on whether the documents included in the clusters of documents 116 are determined to be malicious. In addition or alternatively, a policy engine and/or an analyst may make this determination and may inform the processor 104 of the statuses of the clusters of documents 116.

At block 608, the processor 104 may label the clusters of documents 116 as being malicious or benign based on the determination as to whether the clusters of documents 116 are malicious or benign. In addition, at block 610, the processor 104 may label the clusters of documents 116 as being unknown based on a determination that the clusters of documents 116 are not determined to be malicious or benign. The processor 104 may further store the statuses of the clusters 118 along with the clusters of documents 116 and the cluster code fingerprints 114 in the data store 108.

In some examples, the processor 104 may determine that a certain cluster of documents in the clusters of documents meets a predefined policy. Based on a determination that the certain cluster of documents meets the predefined policy, the processor 104 may output a request to a user who is to determine whether the certain cluster of documents is malicious, benign, or unknown. The processor 104 may receive a response from the user as to whether the certain cluster of documents is malicious, benign, or unknown and may label the certain cluster of documents as being malicious, benign, or unknown based on the received response.

Some or all of the operations set forth in the methods 500, 520, and 600 may be included as utilities, programs, or subprograms, in any desired computer accessible medium. In addition, the methods 500, 520, and 600 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 7:
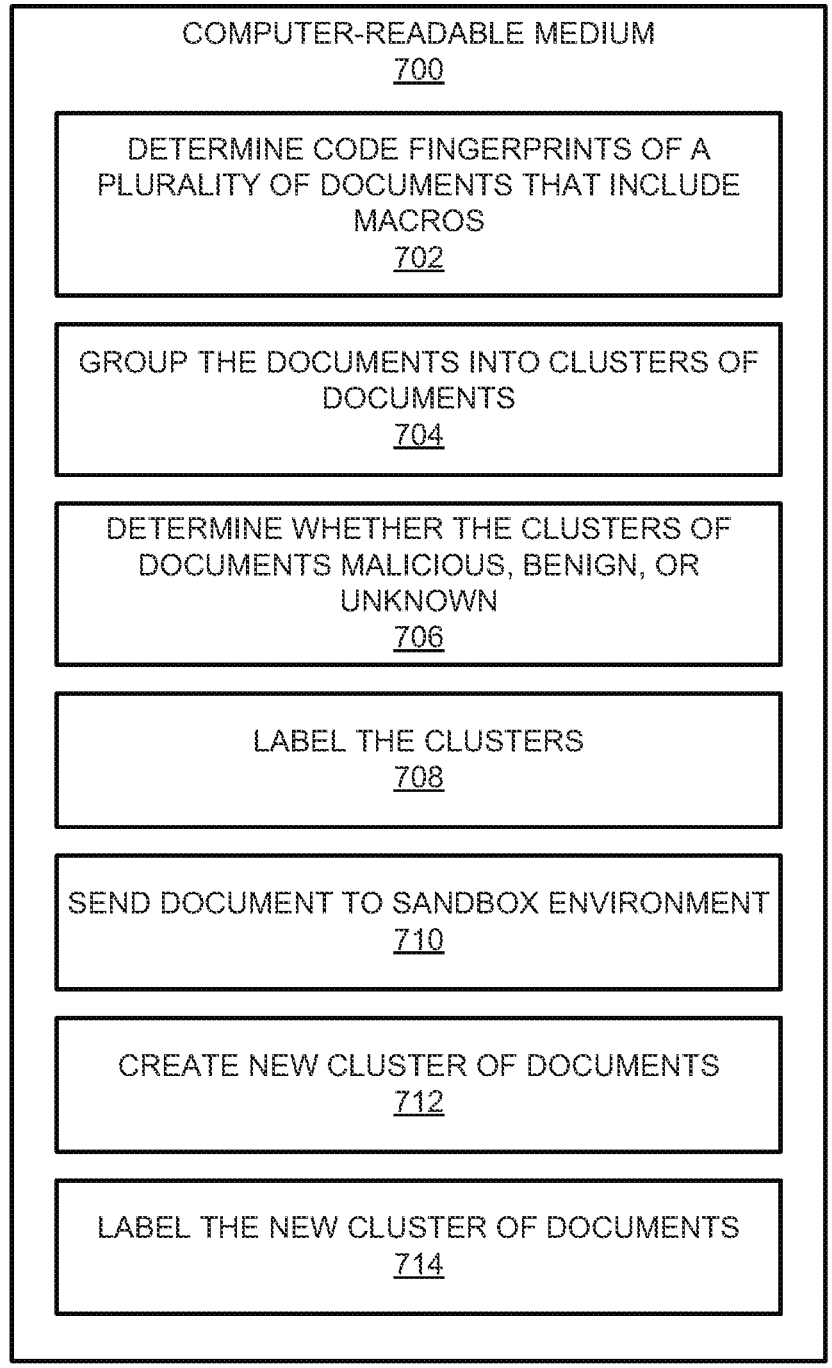
FIG. 7 shows a block diagram of a computer-readable medium that may have stored thereon computer-readable instructions to determine whether clusters of documents are malicious, benign, or unknown based on code fingerprints of documents in the clusters of documents, in accordance with an embodiment of the present disclosure.

Turning now to FIG. 7, there is shown a block diagram of a computer-readable medium 700 that may have stored thereon computer-readable instructions to determine whether clusters of documents 116 are malicious, benign, or unknown based on code fingerprints of documents in the clusters of documents 116, in accordance with an embodiment of the present disclosure. It should be understood that the computer-readable medium 700 depicted in FIG. 7 may include additional instructions and that some of the instructions described herein may be removed and/or modified without departing from the scope of the computer-readable medium 700 disclosed herein. The computer-readable medium 700 may be a non-transitory computer-readable medium, in which the term "non-transitory" does not encompass transitory propagating signals.

The computer-readable medium 700 may have stored thereon computer-readable instructions 702-714 that a processor, such as the processor 104 of the apparatus 102 depicted in FIGS. 1-4, may execute. The computer-readable medium 700 may be an electronic, magnetic, optical, or other physical storage device that contains or stores executable instructions. The computer-readable medium 700 may be, for example, Random Access memory (RAM), an Electrically Erasable Programmable Read-Only Memory (EEPROM), a storage device, an optical disc, and the like.

The processor may fetch, decode, and execute the instructions 702 to determine code fingerprints of a plurality of documents 120a-120n that include macros 122a-122n. As discussed herein, the code fingerprints may correspond to respective functionalities of the macros 122a-1220 in the documents 120a-120n. The processor may fetch, decode, and execute the instructions 704 to group the plurality of documents into clusters of documents 116 according to the code fingerprints of the documents, each of the clusters of documents 116 including documents that have code fingerprints that are within a predefined similarity threshold with respect to each other. The predefined similarity threshold may be similar or equivalent to the predefined similarity level discussed herein.

The processor may fetch, decode, and execute the instructions 706 to determine whether the clusters of documents 116 are malicious, benign, or unknown. The processor may fetch, decode, and execute the instructions 708 to label the clusters of documents 116 based on whether the clusters of documents are determined to be malicious, benign, or unknown.

The processor may fetch, decode, and execute the instructions 710 to determine a code fingerprint of another document that contains a macro, determine that the code fingerprint of the other document is outside of the predefined similarity threshold with respect to a plurality of cluster code fingerprints associated with the clusters of documents, and send the other document to a sandbox environment 150 to determine whether the document is malicious or benign.

The processor may fetch, decode, and execute the instructions 712 to create a new cluster of documents including the other document. The processor may fetch, decode, and execute the instructions 714 to label the new cluster of documents as being malicious, benign, or unknown based on application of a predefined policy on the new cluster of documents. The processor may further execute instructions to add additional documents having code fingerprints that are within the predefined similarity threshold with respect to the code fingerprint of the document into the new cluster of documents.

The processor may fetch, decode, and execute instructions to determine a code fingerprint of another document that contains a macro, compare the code fingerprint of the other document with the cluster code fingerprints, determine, and based on the comparison, which of the cluster code fingerprints matches most closely to the code fingerprint of the other document. The processor may fetch, decode, and execute instructions to assign the other document with the label assigned to the cluster of documents having the cluster code fingerprint that matches most closely to the code fingerprint of the other document. The processor may fetch, decode, and execute instructions to handle the other document as being malicious, benign, or unknown based on the assigned label of the other document.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
    a processor; and
    a memory on which is stored machine-readable instructions that when executed by the processor, cause the processor to:
        determine a code fingerprint of a document containing a macro, wherein the code fingerprint corresponds to a functionality of the macro;
        compare the code fingerprint of the document to cluster code fingerprints associated with clusters of documents to determine a cluster code fingerprint of the cluster code fingerprints that matches most closely to the code fingerprint of the document;
        subsequent to determining that the code fingerprint of the document matches most closely to the cluster code fingerprint, the cluster code fingerprint associated with a certain cluster of documents, determine whether the code fingerprint of the document is within a predefined similarity level with respect to the cluster code fingerprint associated with the certain cluster of documents;
        in response to a determination that the code fingerprint of the document is within the predefined similarity level with respect to the cluster code fingerprint associated with the certain cluster of documents, determine whether the document is malicious, benign, or unknown based on determining whether the certain cluster of documents is pre-identified as being malicious, benign, or unknown; and
        based on a determination that the certain cluster of documents is pre-identified as being unknown, determine that the document is unknown and send the document to a sandbox environment for detonation to determine whether the document is malicious or benign.

2. The apparatus of claim 1, wherein the instructions cause the processor to:
    based on a determination that the certain cluster of documents is pre-identified as being malicious, determine that the document is malicious without sending the document to the sandbox environment, and handle the document as being malicious by preventing the document from being forwarded to an intended recipient of the document.

3. The apparatus of claim 1, wherein the instructions cause the processor to:
    based on a determination that the certain cluster of documents is pre-identified as being benign, determine that the document is benign without sending the document to the sandbox environment, and handle the document as being benign by forwarding the document to an intended recipient of the document.

4. The apparatus of claim 1, wherein the code fingerprint of the document comprises a function call graph of the macro.

5. The apparatus of claim 2, wherein the certain cluster of documents is pre-identified as being malicious when a number of the documents in the certain cluster is greater than a predetermined number, and a percentage of the documents are malicious.

6. The apparatus of claim 1, wherein the instructions cause the processor to:
    determine that the code fingerprint of the document is outside of the predefined similarity level with respect to the cluster code fingerprint that matches most closely to the code fingerprint of the document; and
    based on the determination that the code fingerprint of the document is outside of the predefined similarity level with respect to the cluster code fingerprint that matches most closely to the code fingerprint of the document, send the document to the sandbox environment to determine whether the document is malicious or benign.

7. The apparatus of claim 6, wherein the instructions cause the processor to:
create a new cluster of documents including the document;
label the new cluster of documents as being malicious, benign, or unknown based on application of a predefined policy on the new cluster of documents; and
add additional documents having code fingerprints that are within the predefined similarity level with respect to the code fingerprint of the document into the new cluster of documents.

8. The apparatus of claim 1, wherein the instructions cause the processor to:
determine code fingerprints of a plurality of documents;
group the plurality of documents into the clusters of documents, wherein documents having code fingerprints that are within the predefined similarity level with respect to each other are grouped into a common cluster;
determine whether the clusters of documents are malicious, benign, or unknown based on application of a predefined policy on the clusters of documents; and
label the clusters of documents as being malicious, benign, or unknown based on the determination as to whether the clusters of documents are malicious, benign, or unknown.

9. The apparatus of claim 8, wherein, to apply the predefined policy, the instructions cause the processor to:
determine that a certain cluster of documents in the clusters of documents meets the predefined policy;
based on a determination that the certain cluster of documents meets the predefined policy, determine whether the certain cluster of documents is malicious, benign, or unknown automatically or from an input from a user; and
label the certain cluster of documents as being malicious, benign, or unknown based on the determination as to whether the certain cluster of documents is malicious, benign, or unknown.

10. A method comprising:
determining, by a processor, a code fingerprint of a document containing a macro, the code fingerprint capturing a functionality of the macro;
comparing, by the processor, the code fingerprint of the document with cluster code fingerprints, each of the cluster code fingerprints corresponding to respective clusters of documents to determine a cluster code fingerprint of the cluster code fingerprints that matches most closely to the code fingerprint of the document, wherein each of the clusters of documents is pre-identified as being malicious, benign, or unknown;
subsequent to determining that the code fingerprint of the document matches most closely to the cluster code fingerprint, the cluster code fingerprint associated with a certain cluster of documents, determining, by the processor, whether the code fingerprint of the document is within a predefined similarity level with respect to the cluster code fingerprint associated with the certain cluster of documents;
in response to a determination that the code fingerprint of the document is within the predefined similarity level with respect to the cluster code fingerprint associated with the certain cluster of documents, determining, by the processor, whether the document is malicious, benign, or unknown based on determining whether the certain cluster of documents is pre-identified as being malicious, benign, or unknown; and
based on a determination that the certain cluster of documents is pre-identified as being unknown, determining, by the processor, that the document is unknown and sending the document to a sandbox environment for detonation to determine whether the document is malicious or benign.

11. The method of claim 10, further comprising:
based on a determination that the certain cluster of documents is pre-identified as being malicious, determining, by the processor, that the document is malicious without sending the document to the sandbox environment, and preventing the document from being forwarded to an intended recipient of the document.

12. The method of claim 10, further comprising:
based on a determination that the code fingerprint of the document is outside of the predefined similarity level with respect to the cluster code fingerprint, sending the document to the sandbox environment to determine whether the document is malicious or benign.

13. The method of claim 10, further comprising:
creating a new cluster of documents including the document;
labeling the new cluster of documents as being malicious, benign, or unknown based on application of a predefined policy on the new cluster of documents; and
adding additional documents having code fingerprints that are within the predefined similarity level with respect to the code fingerprint of the document into the new cluster of documents.

14. The method of claim 10, further comprising:
determining code fingerprints of a plurality of documents that include macros;
grouping the plurality of documents into the clusters of documents, wherein documents having code fingerprints that are within the predefined similarity level with respect to each other are grouped into a common cluster of documents;
determining whether each of the clusters of documents is malicious, benign, or unknown based on application of a predefined policy on each of the clusters of documents; and
labeling the clusters of documents as being malicious, benign, or unknown based on the determination as to whether the clusters of documents are malicious, benign, or unknown.

15. The method of claim 10, further comprising:
based on a determination that the certain cluster of documents is pre-identified as being benign, determining, by the processor, that the document is benign without sending the document to the sandbox environment, and forwarding the document to an intended recipient of the document.

16. A computer-readable storage device on which is stored computer-readable instructions that when executed by a processor, cause the processor to:
determine a code fingerprint of a document containing a macro, wherein the code fingerprint corresponds to a functionality of the macro;
compare the code fingerprint of the document to cluster code fingerprints associated with clusters of documents to determine a cluster code fingerprint of the cluster code fingerprints that matches most closely to the code fingerprint of the document;

subsequent to determining that the code fingerprint of the document matches most closely to the cluster code fingerprint, the cluster code fingerprint associated with a certain cluster of documents, determine whether the code fingerprint of the document is within a predefined similarity level with respect to the cluster code fingerprint associated with the certain cluster of documents;

in response to a determination that the code fingerprint of the document is within the predefined similarity level with respect to the cluster code fingerprint associated with the certain cluster of documents, determine whether the document is malicious, benign, or unknown based on determining whether the certain cluster of documents is pre-identified as being malicious, benign, or unknown; and based on a determination that the certain cluster of documents is pre-identified as being unknown, determine that the document is unknown and send the document to a sandbox environment for detonation to determine whether the document is malicious or benign.

17. The computer-readable storage device of claim 16, wherein the instructions further cause the processor to:

determine code fingerprints of a plurality of documents;

group the plurality of documents into the clusters of documents, wherein documents having code fingerprints that are within the predefined similarity level with respect to each other are grouped into a common cluster;

determine whether the clusters of documents are malicious, benign, or unknown based on application of a predefined policy on the clusters of documents; and label the clusters of documents as being malicious, benign, or unknown based on the determination as to whether the clusters of documents are malicious, benign, or unknown.

18. The computer-readable storage device of claim 16, wherein the instructions further cause the processor to:

create a new cluster of documents including the document;

label the new cluster of documents as being malicious, benign, or unknown based on application of a predefined policy on the new cluster of documents; and add additional documents having code fingerprints that are within the predefined similarity level with respect to the code fingerprint of the document into the new cluster of documents.

19. The computer-readable storage device of claim 16, wherein the instructions further cause the processor to:

based on a determination that the certain cluster of documents is pre-identified as being malicious, determine that the document is malicious without sending the document to the sandbox environment, and handle the document as being malicious by preventing the document from being forwarded to an intended recipient of the document.

20. The computer-readable storage device of claim 16, wherein the instructions further cause the processor to:

based on a determination that the certain cluster of documents is pre-identified as being benign, determine that the document is benign without sending the document to the sandbox environment, and handle the document as being benign by forwarding the document to an intended recipient of the document.

\* \* \* \* \*